United States Patent [19]

Hagen et al.

[11] Patent Number: 4,990,662

[45] Date of Patent: * Feb. 5, 1991

[54] PROCESS FOR PREPARATION OF ALPHA, BETA-UNSATURATED ACIDS

[75] Inventors: Gary P. Hagen, Glen Ellyn; Ruth A. Montag, Naperville, both of Ill.

[73] Assignee: Amoco Corporation, Chicago, Ill.

[ * ] Notice: The portion of the term of this patent subsequent to Jul. 24, 2007 has been disclaimed.

[21] Appl. No.: 78,375

[22] Filed: Jul. 27, 1987

Related U.S. Application Data

[63] Continuation-in-part of Ser. No. 946,986, Dec. 29, 1986, Pat. No. 4,943,659, which is a continuation of Ser. No. 785,326, Oct. 7, 1985, abandoned, which is a continuation of Ser. No. 632,018, Jul. 18, 1984, abandoned, which is a continuation of Ser. No. 412,914, Aug. 30, 1982, abandoned.

[51] Int. Cl.$^5$ .................. C07C 51/353; C07C 51/377; C07C 57/04; C07C 57/26; C07C 57/42

[52] U.S. Cl. .................. 562/599; 260/405.5; 562/400; 562/405; 562/495; 562/503; 562/504; 562/510

[58] Field of Search ............... 562/599, 598, 504, 400, 562/495, 503, 510, 405; 260/405.5

[56] References Cited

U.S. PATENT DOCUMENTS 3,840,587 10/1974 Pearson ........................... 560/210
4,361,264 12/1986 Hagen ........................... 562/599 X Primary Examiner—Vivian Garner
Attorney, Agent, or Firm—Reed F. Riley; William H. Magidson; Ralph C. Medhurst

[57] ABSTRACT

Catalyst and process are disclosed for the improved preparation of alpha, beta-unsaturated acids. The catalyst comprises a porous silica gel component and a Group IA alkali metal component, which is present in an amount of from 200 to 20,000 parts per million and optionally another component such as tin (IV) oxide, and mixtures thereof. The process comprises reacting formaldehyde and an aliphatic carboxylic acid in the presence of said catalyst while maintaining catalyst activity and selectivity during the process by addition of a source of the alkali metal component.

14 Claims, No Drawings

PROCESS FOR PREPARATION OF ALPHA, BETA-UNSATURATED ACIDS

This application is a continuation-in-part of application Ser. No. 946,986, filed Dec. 29, 1986, which in turn is continuation of application Ser. No. 785,326, filed Oct. 7, 1985 and now abandoned, which in turn is a continuation of application Ser. No. 632,018, filed July 18, 1984 and now abandoned, which in turn is a continuation of application Ser. No. 412,914, filed Aug. 30, 1982 and now abandoned.

BACKGROUND OF THE INVENTION

This invention is directed to a process for synthesis of alpha, beta-unsaturated acids by reaction between formaldehyde and a carboxylic acid of the formula $RCH_2COOH$ wherein R is a member of the class consisting of —H, -alkyl, -aryl, -aralkyl, and -cycloalkyl radicals. When R is not hydrogen, the number of carbons in R is preferably from 1 to 18.

This invention is more specifically directed to a process for synthesis of alpha, beta-unsaturated acids, e.g., alpha-methacrylic acid from propionic acid and formaldehyde. The process requires the presence of a catalyst containing a porous silica gel, a Periodic Group IA metal ion such as sodium or cesium ion, and, optionally another material such as tin (IV) oxide. In particular, this invention is directed to a process for maintaining activity and selectivity of such a catalyst in such a process wherein a sufficiently feed soluble or volatile source of alkali metal ions is added during the process whereby the required level of basic metal components of Group IA is maintained upon the catalyst.

Unsaturated acids, such as methacrylic and acrylic acids, acrylonitrile and the esters of such acids, such as methyl alpha-methacrylate, are widely used for the production of corresponding polymers, resins and the like. Various processes and catalysts have been proposed for the conversion of alkanoic acids, such as propionic acid, and formaldehyde to the corresponding unsaturated monocarboxylic acids, e.g., methacrylic acid, by an aldol-type reaction. Generally, the reaction of the acid and formaldehyde takes place in the vapor or gas phase while in the presence of a basic or acidic catalyst.

Various catalysts have been proposed for such reaction. For example, Vitcha, et al., *I&EC Product Research and Development*, 5, No. 1 (March, 1966) pp. 50-53, propose a vapor-phase reaction of acetic acid and formaldehyde employing catalysts comprising alkali and alkaline earth metal aluminosilicates, silica gel, alumina and the like. U.S. Pat. No. 2,821,543 teaches use of a catalyst comprising a basic metal compound such as a basic salt or oxide upon activated silica. The example taught is 10 wt.% of manganese oxide on activated silica. U.S. Pat. No. 3,051,747 describes the preparation of acrylic acids by reacting an alkanoic acid and formaldehyde in the presence of a catalyst comprising an alkali metal salt of the alkanoic acid supported on alumina. The same reaction is also promoted by catalysts which include alkali metal or alkaline earth metal aluminosilicates, silica gel or alumina. Catalysts of this kind are described in U.S. Pat. No. 3,247,248 which teaches a process for the reaction of formaldehyde and acetic acid or propionic acid in the presence of a natural or synthetic aluminosilicate catalyst that may include alkali or alkaline earth metals, such as the aluminosilicates of sodium, potassium, rubidium, magnesium, calcium, strontium or barium. In addition, the use of silica gel in combination with an alkali metal or alkaline earth metal hydroxide as a catalyst for the reaction is described. U.S. Pat. Nos. 3,840,587 and 3,840,588 teach preparation of alpha, beta-ethylenically unsaturated compounds by vapor-phase reaction of formaldehyde and saturated carboxylic acids in the presence of a Group IA metal compound associated with a silica gel support, the content of the Group IA compound calculated as the hydroxide in the range of 0.01 to 10 weight percent of the completed catalyst. U.S. Pat. No. 3,933,888 teaches the preparation of unsaturated acids, and the preparation of esters and nitriles of such unsaturated acids wherein alkanoic acids, esters of such acids and alkyl nitriles are reacted with formaldehyde in the presence of a basic catalyst comprising pyrogenic silica. Pyrogenic silica is taught as displaying radically different properties from silica gel. The pyrogenic silica is taught as especially effective when treated with activating agents which provide basic sites on the pyrogenic silica catalyst support, such as organic bases, inorganic bases of Groups IA, IIA and IIIB of the Periodic Table, particularly the alkaline metal hydroxides such as potassium hydroxide and cesium hydroxide. The addition of a compound of a metal as an activating agent is taught as increasing the effectiveness of the catalyst.

Other processes and catalysts have been proposed for the preparation of methacrylic acid, esters and nitriles. U.S. Pat. No. 3,089,898 teaches a process and catalyst for preparation of methyl acrylate which comprises contacting vapor mixtures of methyl acetate and formaldehyde with aluminosilicate catalysts, particularly alkaline earth metal zeolites, alkali metal zeolites and zeolites of certain heavy metals such as manganese, cobalt, zinc, cadmium and lead. Aqueous and alcoholic sources of formaldehyde are taught as useful. U.S. Pat. No. 3,089,899 teaches preparation of methyl methacrylate which comprises contacting vapor mixtures of methyl propionate and formaldehyde with zeolite catalysts, particularly certain synthetic zeolites, especially the aluminosilicates of Group IIA of the Periodic Table, such as magnesium, calcium, strontium and barium aluminosilicates, and manganous aluminosilicates. Aqueous or alcoholic formaldehyde or anhydrous paraformaldehyde can be used. U.S. Pat. No. 3,535,371 teaches a process and catalyst for preparing acrylic esters by contacting a gaseous mixture of formaldehyde, an aliphatic carboxylic acid such as acetic, propionic, butyric, valeric, caproic and the like, and an aliphatic alcohol such as methanol, ethanol, propanol, butanol, pentanol, hexanol and the like, in the presence of a niobium oxide catalyst upon a catalyst support of silicon carbide, silica or alumina, but preferably alumina. Formaldehyde used can be of any suitable form, either anhydrous or aqueous. U.S. Pat. No. 4,118,588 teaches a process and catalyst for preparing methacrylic acid and methyl methacrylate which comprises reacting, respectively, propionic acid and methyl propionate with dimethoxymethane in the presence of catalysts based on phosphates and/or silicates of magnesium, calcium, aluminum, zirconium, thorium and/or titanium and in the presence of water. Boric acid and/or urea can also be present. Preferably, the catalysts are modified with alkali metal and/or alkaline earth metal carboxylates and/or alkali metal compounds and/or alkaline earth metal compounds which yield carboxylates under the reaction conditions. Suitable modifiers are the carboxylates, oxides and hydroxides of lithium, sodium, potassium, magnesium and calcium as well as those of beryllium, strontium, rubidium, cesium and barium.

However, the process and catalysts taught heretofore suffer from disadvantages which are greatly minimized in the process of the present invention. The processes as described in Vitcha, *I&EC*, *op. cit.* p. 50, are inferior to the present invented process in that conversion of formaldehyde is low when reactant acid concentration is low. Hence, large excesses of acid reactant are used and, thus, acid conversion is necessarily low. Vitcha indicates that as the ratio of reactant acid to formaldehyde decreases, the competitive reaction of formaldehyde with itself to form polymers predominates, to result in lower conversion and yield. U.S. Pat. No. 3,051,747 indicates that yields are low (5 to 11%) and the major product of the process is not an unsaturated compound but a symmetric ketone. Processes described in U.S. Pat. Nos. 3,247,248 and 3,933,888 are also inferior to the process of the present invention. Yield percent based on formaldehyde taught by U.S. Pat. No. 3,247,248 with 5:1 ratios of acid to formaldehyde is between 29 and 40 percent. U.S. Pat. No. 3,933,888 teaches the major products are methacrylic acid and its ester, methyl methacrylate, not methacrylic acid predominantly.

In addition to the above disadvantages, the references fail to appreciate the level of alkali content of the catalyst as being significant. The references also fail to appreciate that there is an apparent loss of alkali content as the reaction continues.

An object of the present invention is to provide a catalyst and process for making alpha, beta-unsaturated acids from formaldehyde and aliphatic carboxylic acids. A further object is to provide a catalyst and process for making alpha, beta-unsaturated acids from formaldehyde and aliphatic carboxylic acids wherein catalyst activity and selectivity is maintained. A further object is to provide a catalyst and process for making alpha-methacrylic acid. Another object is to provide a catalyst and process for acrylic acid. Other objects will appear hereinafter.

Quite unexpectedly it has been found that modified or unmodified silica gel catalysts prepared from precipitated colloidal silica perform in a much superior manner for the present condensation process with respect to conversion and selectivity relative to conventional catalysts, based on silica gel and the like. The improved catalyst formulation has several unexpected results. Whereas conventional catalyst formulations result in low formaldehyde-based yields of methacrylic acid when the ratio of propionic acid to formaldehyde is low, such as 1:1, high yields of alpha-methacrylic acid can be obtained in the process of the instant invention when the ratio of propionic acid to formaldehyde is as low as about 0.1:1. Preferred reactant acid:formaldehyde ratio for the process of the present invention is 1:1 to 5:1, preferably 1:1 or 2:1, with consequent economic advantage. The present invention is preferably with the use of a dry formaldehyde such as gaseous monomer, methanolic formaldehyde, trioxane or paraformaldehyde; and the catalyst preferably contains low levels of the active basic components of Group IA such as sodium or cesium, or other basic components of other groups of the Periodic Table.

Also unexpectedly it has been found that the process of the instant invention wherein an alkali component is added continuously or discontinuously to the feed materials prolongs catalyst activity and selectivity aiding in maintaining product yields. This improvement is shown for a wide variety of alkali-metal-loaded, porous-silica-gel-based condensation catalysts.

SUMMARY OF THE INVENTION

A catalyst and process are disclosed for preparation of alpha, beta-unsaturated acids by reaction of formaldehyde and a carboxylic acid of the formula $RCH_2COOH$ wherein R is a member of the class consisting of —H, -alkyl, -aryl, -aralkyl, and -cycloalkyl radicals in the presence of a catalyst containing precipitated colloidal silica wherein an alkali metal component is continually present under reaction conditions wherein the reactant acid:formaldehyde ratio is from about 0.1:1 to 20:1 at a temperature within the range of from about 250° C to about 430° C. The presence of the alkali metal component is maintained by adding a quantity of the alkali metal component as a soluble or volatile compound during the process.

DETAILS OF THE INVENTION

The process of the instant invention relates to the preparation of alpha, beta-unsaturated acids by reaction of formaldehyde and a carboxylic acid of the formula $RCH_2COOH$ wherein R is a member of the class consisting of —H, -alkyl, -aryl, -aralkyl, and -cycloalkyl radicals, the number of carbon atoms in R being preferably from 1 to 18, in the presence of a porous-silica-gel-based catalyst which can be prepared from a colloidal suspension of silica particles wherein the alkali metals content is maintained in the range of from about 200 ppm to about 20,000 ppm, as sodium and, alternatively, in mol equivalents, as other Group IA alkali metals of the Periodic Table of Elements found in the 46th edition of the *Handbook of Chemistry and Physics* published by the Chemical Rubber Company.

The alpha carbon of the reactant acid of the formula $RCH_2COOH$ is required to possess at least two hydrogen atoms. When R is not hydrogen, suitable carboxylic acids preferably contain from 1 to 18 carbon atoms in addition to the —$CH_2COOH$ moiety. Examples are acetic acid, propionic acid, n-butyric acid, n-valeric acid, isovaleric acid, n-caproic acid, n-heptanoic acid, capric and lauric acids, phenylacetic acid, gamma-phenylbutyric acid, and 3-methylcyclopentylacetic acid.

The process of the instant invention also relates to a synthesis of alpha-methacrylic acid from propionic acid and formaldehyde in the presence of a porous-silica-gel-based catalyst. Yield of alpha-methacrylic acid is increased over previously taught processes and production of byproducts is minimized. One catalyst used in the present invention requires use of a precipitated highly pure silica gel catalyst prepared by precipitating a colloidal silica under controlled conditions in the presence of hydrogen ions to obtain a firm silica gel. Naturally occurring content of trace metals, i.e., aluminum, zirconium, titanium and iron, in highly pure water glass used to make silica gel, is preferably under 500 parts per million (ppm) by weight of each trace metal. The gel is thereupon dried, crushed, optionally washed and redried, followed by calcining at a suitable temperature to obtain a silica gel catalyst containing from about zero to about 500 ppm, individually, of aluminum, zirconium, titanium or iron, about 200 to 20,000 ppm of an alkali metal, measured as sodium and as sodium mol equivalents, preferably from about 1000 to about 15,000 ppm of sodium in the form of a sodium compound, or of sodium mol equivalents, and having a surface area of about 50 to about 500 m²/g, pore volume of from about 0.5 to 3.5 cc/g, average pore diameter of from about 80 to 600 Å. A narrow distribution of large pores, larger than 100 Å, is preferred. A narrow distribution of pore size is obtained when the colloid is gelled preferably at a pH of from about 5.0 to about 6.0, preferably of about 5.5. A lower pH of 2 to 3 or a higher pH of 7 to 8 results in a broader distribution. The washing of the gel is optional, depending upon whether the basic salts of metals of Group IA are desirably incorporated into the catalyst during the gellation process or are later impregnated into the catalyst whereupon preliminary washing is required to reduce the level of the Group IA metals to less than 200 ppm.

It has been found that catalysts prepared by the above method are effective in catalyzing the reaction of carboxylic acids of the formula $RCH_2COOH$ and formaldehyde under anhydrous conditions wherein the acid:-formaldehyde ratio is from about 0.1:1 to about 20:1 at a temperature within the range of from about 250° C. to about 430° C. Dry formaldehyde monomer in gaseous form, paraformaldehyde, methanolic formaldehyde or trioxane can be used as a formaldehyde source.

It is preferred for the process and catalyst of the instant invention that water in the reactant acid-formaldehyde feed and in the reactor under operating conditions be maintained at a level of no more than 20% of total weight of the acid-formaldehyde reactant in anhydrous form, preferably no greater than a maximum of 8% by weight added to the combined weight of the anhydrous acid-formaldehyde-water feed, more preferably no greater than 4% by weight. Since water is produced as a by-product of the instant reaction, the reaction can be self-deactivating to the extent that higher conversions of the reactant acidformaldehyde feed cause higher gas phase concentrations of water in the catalyst bed, thus requiring an increased operating temperature or increased catalyst alkali levels, which, in turn, decreases selectivity to the alpha, beta-unsaturated acids.

It is essential that catalyst content of alkali metal ion, as mentioned already, be within the range of from about 200 to about 20,000 ppm, measured as sodium or as sodium mol equivalents, as catalyst activity and selectivity in the synthesis of alpha, beta-unsaturated acid are closely linked to the level of alkali metal present in the catalyst. For example, if the level of sodium is too low, below 200 ppm, product yields and selectivities are low because of low conversions and decomposition of formaldehyde to gaseous products and/or coke products. If too high, above 20,000 ppm of sodium in the catalyst, propionic acid and formaldehyde selectivities to methacrylic acid become low.

Measurement of alkali metal content as sodium mol equivalents is defined as measurement of alkali metal content present in mol of Group IA metals equivalent to mols of sodium measured in parts per million.

Alkali metals other than sodium can be used in preparation of the instant invented catalyst. Lithium, potassium, rubidium, and particularly cesium, as well as sodium, are suitable. Both potassium- and cesium-loaded silica catalysts exhibit significantly higher catalytic activities than the lithium- and sodium-silica catalysts but with less selectivity to methacrylic acid at the temperatures preferred for the sodium- and lithium-containing catalysts. The higher activity and lower selectivity can be compensated for by using lower loading levels of potassium and cesium on the silica catalysts. Cesium is the preferred alkali metal ion because of its higher activity.

The alkali metal can be incorporated into the remainder of the catalyst by using any suitable source of alkali metal ion. Hydroxides of sodium, potassium, lithium, rubidium, and cesium can be used as well as phosphates, silicates, carbonates and other alkali metal salts, including halides, cyanates, borates, aluminates, nitrates, sulfates, sulfides, titanates, tungstates, vanadates, stannates, alkanoates and any inorganic and organic base that can be incorporated into or on the catalyst under the required reaction conditions.

Experience has shown that as the process proceeds there is loss of alkali metal from the process catalyst with concurrent loss of catalyst activity. Accordingly, the instant invention adds a source of alkali metal ions to the reaction process to maintain catalyst activity and selectivity. Any suitable method of addition can be used including direct addition to the feedstock, liquid phase impregnation in the reactor, and sublimation. Any suitable source of alkali metal ion can be used. Hydroxides of sodium, potassium, lithium, rubidium, and cesium can be used as well as phosphates, silicates, carbonates and other alkali metal salts, including halides, cyanates, borates, aluminates, nitrates, sulfates, sulfides, titanates, tungstates, vanadates, stannates, alkanoates and any inorganic and organic base that is sufficiently soluble or sublimable in the reaction mixture to provide a source of alkali metal ions. The alkanoates are particularly preferred. Since loss of alkali metal ion will depend upon a variety of reaction conditions including propionic acid-formaldehyde ratio, LHSV, and reaction temperature, rate of addition of added alkali metal ions will vary but the rate of addition is such that the level of alkali metal ions on the catalyst is maintained within the level of from about 200 to about 20,000 ppm, preferably from about 1000 to about 15,000 ppm as sodium, or as Group IA metals in sodium mol equivalents measured in parts per million. Addition of alkali metal ion can be made continuously or discontinuously, continuously at a predetermined rate or, discontinuously, as the level of sodium ion replenishment is required, as determined by suitable analysis or test results.

The novel process of the present invention is useful to synthesize alpha-methacrylic acid from propionic acid and formaldehyde. The instant invented process is useful in synthesis of acrylic acid by the vapor phase reaction of acetic acid and formaldehyde. The instant invented process is useful in synthesizing other unsaturated monocarboxylic acids.

The amorphous silica colloid from which the precipitated silica catalyst is prepared can be prepared using any commercially available sodium silicate or as taught in U.S. Pat. Nos. 2,244,325; 2,574,902; 2,577,484; 2,577,485; 2,750,345; 3,012,973 and 3,440,176 which are incorporated herein by reference. Preparations of colloidal silica available from commercial sources can also be used, such as Nalcoag (Trademark), a product of Nalco Chemical Company, Chicago, Ill., and Ludox (Trademark) colloidal silica, a product of E. I. du Pont de Nemours & Co. (Inc.), Industrial Chemicals Dept., Wilmington, Del. Commercially available silica colloids provide catalysts which are quite selective (especially at low reaction temperatures and/or contact times) in spite of the existence of trace metal impurities (aluminum, zirconium, titanium, iron, etc.) normally present in such colloids. However, it has been found that acid extraction of these impurities from the silica gels to lower levels (below 100 ppm in the case of some impurities as sodium) and subsequent impregnation with an active alkali metal salt improves selectivity to methacrylic acid significantly.

Accordingly, it has been found that a more reactive catalyst containing the lowest possible levels of aluminum, zirconium, titanium and iron is obtained by the method of the instant invention which results in substantially increased product yields and minimum production of by-products in the invented process.

In addition to catalysts containing only porous silica gel and alkali metal ion, usefully improved catalysts can be made by incorporating a third component, for example tin (IV) oxide, where the porous silica gel and the tin compound are in the form of a mixed oxide as taught in United States Ser. No. 891,755, filed July 31, 1986, now abandoned, the contents of which are incorporated herein by reference.

The instant invented process is a single step process for synthesis of alpha-methacrylic acid which is catalyzed effectively by a porous-silica-gel-based catalyst which can be obtained by colloidal silica and the in situ regeneration of such catalyst.

The invented process involves the condensation of formaldehyde, conveniently as trioxane, with propionic acid. Although the mechanism is unknown, propionic acid is known to form surface species on silica gel (probably surface silyl esters of propionic acid) which may be intermediates in this reaction.

Formaldehyde can be used in any suitable dry form such as dry formaldehyde monomer in a gaseous state, paraformaldehyde, methanolic formaldehyde and trioxane.

The reaction occurs at atmospheric pressure in the gas phase when the reactants are passed through the catalyst in the presence of a nitrogen carrier gas at a temperature of about 250° C. to about 430° C. Above 400° C. significant amounts of various by-products are formed. Reactant pressures of from about 0.5 to 10 atmospheres can be used. A broad range of reactant ratios may be successfully used for this process of from 0.1:1 to 20:1, preferably in ratios of 1:1 to 5:1, acid:formaldehyde. For example, when propionic acid and formaldehyde, (as trioxane), in mol ratios varying from 5:1 to 1:1, propionic acid:available formaldehyde, are allowed to react at a temperature of 385° C. (or 390° C.), yields of methacrylic acid obtained vary, respectively, from 6–31% based on propionic acid. In these examples the percent of total propionate observed in the product mixture, either as unreacted propionic acid, methacrylic acid, or 3-pentanone (the major by-product) varies from 90–100%, depending on the reactant ratios and reaction conditions. Highest levels of 3-pentanone occur in the product mixture when the reaction is carried out at higher temperatures (>400° C.) and/or with feed containing high levels of propionic acid, e.g., 5:1 mol ratio of propionic acid to formaldehyde. Useful temperatures for this process may be as high as 425° C., at which point uncatalyzed degradation reactions of propionic acid are known to occur. At temperatures below 250° C., yields of methacrylic acid are low.

Yields as high as 76%, based on propionic acid, have been obtained with mol ratios of 0.143:1 in the presence of a diluent such as toluene. Other aromatics include benzene and xylenes.

Liquid hourly space velocity (LHSV) measured in terms of volume of liquid per volume of catalyst per hour ($V_l C_c^{-1} hr^{-1}$), is from about 0.05 to 20.0, preferably from about 0.1 to about 10.0. A LHSV less than about 0.05 results in nonselective decomposition of reactants. A LHSV above 20 results in low conversion of reactants.

Yield calculations can be based upon either propionic acid or formaldehyde. For example, propionic acid-based yields are calculated as follows:

$$\frac{\text{Mols of Methacrylic Acid Product}}{\text{Mols Propionic Acid in Feed}} \times 100 = \text{Yield}$$

Formaldehyde-based yields are calculated as follows:

$$\frac{\text{Mols of Methacrylic Acid Product}}{\text{Mols Formaldehyde in Feed}} \times 100 = \text{Yield}$$

Propionic acid selectivity is calculated as follows:

$$\frac{\text{Mols of Methacrylic Acid Product}}{\text{Mols Propionic Acid Reacted}} \times 100 = \text{Propionic Acid Selectivity}$$

Formaldehyde selectivity is calculated similarly. Propionic acid conversion is calculated as follows:

$$\frac{\text{Mols Propionic Acid Reacted}}{\text{Mols Propionic Acid in Feed}} \times 100 = \text{Conversion}$$

Methacrylic acid yield is equal to propionic acid conversion × propionic acid selectivity. Formaldehyde conversion is calculated similarly.

The invention will be illustrated by reference to the following specific examples. It should be understood, however, that the detailed expositions of the process and catalyst of the invention, while indicating preferred embodiments, are given by way of illustration only since various changes and modifications within the spirit and scope of the invention will become apparent to those skilled in the art and are not intended to limit the scope of the invention.

Analysis of catalysts was by atomic absorption (A. A.) spectroscopy and by Edax spectroscopy (energy dispersive analysis of X-ray fluorescence for qualitative and semi-quantitative analysis). Limit of resolution of analysis by Edax is about 100 parts per million. In the following Examples, Edax analysis results can be indeterminate wherein element content is 100 parts per million or less.

EXAMPLE I

An amorphous silica-alumina colloid containing added contaminant aluminum was prepared in the following manner. A sodium form of a low-level aluminosilicate was formed to obtain a catalyst of lower selectivity.

A quantity (286.0 gms) of commercial sodium silicate solution (40-42 B-, 28.4% $SiO_2$, technical grade) was diluted to 2.000 kg. To this was added 0.164 gms of $NaAlO_2 \cdot 1\frac{1}{2}H_2O$ dissolved in 10 ml of distilled water. Of this solution, 72 gms were reserved and the remainder was passed in four batches through a strong acid ion-exchange column (4 ft. column, 1.5 inches in diameter, filled halfway with 500 ml of Amberlite 120 H) at a rate of 25 ml/min.

The effluent was almost clear (very slightly cloudy) and the pH of the four batches was 3.4–3.6. The reserved 73 gms of dilute sodium silicate were added to the combined batches of polysilicic acid and the resulting pH was 7.5. (This procedure is carried out in order to stabilize the polysilicic acid against gelling, especially heat induced.) The entire solution was added to a 1 gallon autoclave and heated for six hours at a temperature of 185° C. for the purpose of growing polysilicic acid into large colloidal particles, 100-200 Å. The solution was allowed to cool to room temperature and was then concentrated to 17% silica content by vacuum evaporation at 30° C. to prepare an amorphous alumina-silica colloid.

A 140 g sample of silica colloid as prepared above was added to a beaker, and with stirring, the pH was lowered from about 10.5 to 3.0 by the dropwise addition of concentrated nitric acid. The pH was then raised to 6.0 by the dropwise addition of concentrated ammonium hydroxide. The mixture was allowed to stir at about 50° C. for six hours, after which a thick gel was formed. The gel was dried for two hours in a drying oven at a temperature of 130° C., crushed and sieved to 18/40 mesh granules, and was then washed five times with distilled water at 95° C. in order to remove excess sodium. The catalyst was then redried and calcined for 16 hours at a temperature of 525° C. to prepare 22 grams of Catalyst A, a sodium form of an amorphous silica-alumina gel. This material was analyzed by A. A. spectroscopy and by Edax spectroscopy to contain 600 ppm of aluminum, 700 ppm of sodium, <100 ppm of zirconium, <100 ppm of titanium and <200 ppm of iron. BET surface area was 112 m$^2$/gm, pore volume: 0.5373 cc/gm, average pore diameter: 154 Å.

EXAMPLE II

The sodium form of Catalyst A was converted to the hydrogen form, Catalyst B, which demonstrated a further decrease in selectivity to methacrylic acid when used as a catalyst.

A 4.75 gm sample of the preparation of Catalyst A was added to a flask containing 7.6 ml of 4N ammonium acetate. The contents were heated to 50° C., removed from the heat and allowed to cool for two hours to about room temperature. The solution was removed by decantation and the catalyst was washed three times with distilled water at room temperature. This exchange and wash procedure was repeated two more times, after which the catalyst was dried for 16 hours at a temperature of 120° C. and then calcined for 16 hours at a temperature of 525° C. to prepare Catalyst B, a hydrogen form of an amorphous silica-alumina colloid. This material was reported to contain 600 ppm of Al and 300 ppm of Na by A. A. spectroscopy. Other analyses were: <100 ppm zirconium, <100 ppm titanium, <100 ppm iron, by Edax spectroscopy.

EXAMPLE III

An amorphous silica colloid was prepared in the procedure of Example I except that sodium aluminate was excluded from the preparation. The resulting colloidal silica catalyst, Catalyst C, was reported to contain 360 ppm Al, and 1630 ppm Na by A. A. spectroscopy. Other analyses were: <100 ppm zirconium, <100 ppm titanium, <200 ppm iron by Edax spectroscopy. The resulting catalyst, Catalyst C, demonstrated higher selectivity with only naturally occurring aluminum in the commercial sodium silicate.

EXAMPLE IV

Example III was repeated with a commercial colloidal silica.

A 200 ml sample of commercial colloidal silica, Ludox (Trademark) AS-40 Brand, E. I. du Pont de Nemours & Co. (Inc.), Industrial Chemicals Dept., Wilmington, Del., was placed in a beaker. Temperature was 25° C. The material was an aqueous colloidal dispersion of silica particles having a high specific surface area. Characteristics were as follows: specific surface area, m$^2$/g 130; av. particle diameter, mm 21; silica (as $SiO_2$) 40 wt%; pH (25° C.) 8.0. With stirring, the pH of the sample was lowered from about 10.5 to 3.0 by the dropwise addition of concentrated nitric acid (0.16 N). The pH was then raised to about 6.0 by the dropwise addition of concentrated ammonium hydroxide (0.15 N). The mixture was thereupon stirred for 8 hours, at a temperature of 25° C., at which time a thick gel had formed. The gel was dried for 2 hours in a drying oven at a temperature of 120° C., then crushed and sieved to 18/40 mesh granules (U.S. sieve). The resulting catalyst, Catalyst D, was then calcined for 16 hours at a temperature of 525° C. Analysis by A. A. spectroscopy was: 400 ppm aluminum, 2100 ppm sodium, and <100 ppm zirconium, <100 ppm titanium, <200 ppm iron by Edax spectroscopy.

EXAMPLE V

A 100 gm sample of uncalcined but dried catalyst was prepared according to the procedure of Example IV. The sample was placed in a flask and covered with 0.1 N aqueous $HNO_3$ to a level ¼ inch over the top of the gel layer. The mixture was heated to a temperature of 50° C. and held at that temperature for about 15 minutes. The solution was decanted off the granules. The procedure was repeated two more times with 0.16 N aqueous $HNO_3$. The procedure was then repeated three times using distilled water to remove residual $HNO_3$. The solid was then dried according to the procedure of Example IV. The resulting material was then analyzed by A.A. spectroscopy and reported to contain 260 ppm sodium and 87 ppm aluminum. No iron, zirconium or titanium was detected by Edax spectroscopy. This demonstrates the practicality of significantly lowering the levels of aluminum, zirconium and iron. This material is a useful support for impregnation of catalytically-active basic materials.

EXAMPLE VI

The four catalysts of Examples I-IV, Catalysts A, B, C and D were screened for the alpha-methacrylic acid synthesis using a quartz reactor positioned in an electric tube furnace. The quartz reactor consisted of a quartz tube fitted with a thermocouple through the center of the tube to measure and control temperature. Inlets were provided at the top of the reactor for the carrier gas stream and feed materials of propionic acid and formaldehyde (as trioxane). The catalyst bed was positioned in the reactor by an inert support material. Product was removed at the bottom of the quartz tube. Reaction conditions and results are given in Table I.

Catalyst A, the sodium form, and Catalyst B, the hydrogen form, of silica-alumina colloid exhibited differences in performance. The sodium form provided significantly better propionic acid and formaldehyde selectivity than the hydrogen form, and the latter caused extensive decomposition of feed to gaseous byproducts and underwent rapid deactivation. Neither Catalyst A nor Catalyst B, tested for the alpha-methacrylic acid synthesis at several reaction temperatures, provided results which were as good as those obtained with the preferred catalyst, Catalyst D. Selectively improved with increasing level of alkali content to over 2000 ppm, as sodium, and increased purity of silica, i.e., lower levels of aluminum, zirconium, titanium and iron. Levels of zirconium, titanium and iron in Catalysts A–D in Examples I–IV, as previously indicated, were equal to or less than 200 parts per million.

TABLE I

Catalyst Analyses and Synthesis Result

| Catalyst | Catalyst Analysis Metal | ppm | Reaction Temp. °C. | Selectivity (Based on Acid) | Yield (Based on Propionic Acid) |
|---|---|---|---|---|---|
| A[1] | Na | 700 | 390 | 70.9[2] | 13.3 |
|  | Al | 600 | 390 | 81.6 | 13.7 |
|  |  |  | 400 | 73.2 | 15.3 |
|  |  |  | 425 | 73.4 | 17.9 |
| B[1] | Na | 300 | 390 | 54.1[2] | 13.1 |
|  | Al | 600 | 390 | 67.6 | 10.8 |
|  |  |  | 380 | 63.9 | 9.0 |
|  |  |  | 370 | 61.3 | 7.4 |
| C[1] | Na | 1630 | 390 | 72.6[2] | 17.8 |
|  | Al | 360 | 390 | 87.4 | 18.7 |
|  |  |  | 380 | 79.4 | 14.5 |
|  |  |  | 370 | 89.7 | 11.2 |
| D[3] | Na | 2100 | 390 | 86.4 | 19.7 |
|  | Al | 400 |  |  |  |

Notes:
Reaction Conditions: Contact Time = 3.2 sec., N₂ Carrier = 6 ml/min., LHSV = 1 (vol-based), Catalyst Vol. = 4.7 cc's, each standard run is of 135.0 minutes duration.
[1]Results presented for 4 consecutive runs.
[2]Typically low on 1st run for most catalysts.
[3]Results of 3rd run.

EXAMPLES VII–XI

Solutions containing a 2:1 mol ratio of propionic acid (PA) to formaldehyde (as trioxane) were prepared and metered into a gas phase reactor as described in Example VI containing 20.99 gms of catalyst (except where noted, vida infra) prepared as described in Example I. Results of Catalysts D and E are outlined in Table II. As is evident from Table II, selectivities based on propionic acid (PA) and formaldehyde improved with shorter contact times while the yield of methacrylic acid based on propionic acid decreased only slightly. Decreased selectivities are attributed to decomposition of reactants and/or product, alpha-methacrylic acid, to coke or gaseous by-products. Even at long contact times the use of a commercially available catalyst, Catalyst E, provided only slightly more than one-half as much yield as the invented Catalyst D at much lower selectivity. Catalyst E is a product of Davison Chemical Div., W. R. Grace & Co., Baltimore, Md. Catalyst E is a silica granule material, Type ID, Grade 57, of 99.5% silica as SiO₂; surface area of 300 m²/g, an alkali content of 742 ppm, as sodium, and an aluminum content of 290 ppm.

TABLE II

Comparative Results
Effect of Contact Time On
Yield of Alpha-Methacrylic Acid

| Example | VII | VIII | IX | X | XI |
|---|---|---|---|---|---|
| Run No. 5825- | 190[1] | 185[1] | 192[1] | 200[1] | 151[2] |
| Catalyst | D | D | D | D | E |
| % Selectivity on: |  |  |  |  |  |
| Propionic Acid | 80.1 | 85 | 88.3 | 96.3 | 50.4 |
| Formaldehyde Yield on: | 83.3 | 82 | 87.5 | 93.2 | 39.5 |
| Propionic Acid | 19.7 | 20 | 17.8 | 16.0 | 11.4 |
| Formaldehyde | 38.6 | 39 | 35.0 | 32.1 | 23.3 |
| % Mass Balance (as liquid) | 97.5 | 98.3 | 98.6 | 101.0 | 91.8 |
| Contact Time (sec.) | 2.81 | 2.41 | 1.82 | 1.53 | 3.30 |
| LHSV (hr⁻¹) [vol. based] | 1.12 | 1.36 | 1.87 | 2.28 | 1.00 |

Notes:
[1]Reaction was carried out at a reaction temperature of 385° C. and at a carrier gas flow rate of 60 ml N₂/minute. In a typical run 200–300 ml of feed containing PA and trioxane are passed through the reactor. Catalyst weight = 20.99 gm. Catalyst volume = 37.0 ml.
[2]Reaction was carried out in a reactor under similar conditions as [1] except with smaller quantities and flow rates. Catalyst weight = 1.82 gms. Catalyst volume = 4.65 ml. Carrier gas rate = 6.0 ml/min.

EXAMPLE XII

In the procedure of Examples VI to XI, syntheses of alpha-methacrylic acid from propionic acid and formaldehyde (as trioxane) were made with Catalyst D, but using mol ratios of acid and formaldehyde of 1:1, 2:1, 3:1, 4:1 and 5:1. Results are in Table III.

TABLE III

Effect of Mole Ratios of 1:1 to 5:1
Propionic Acid to Formaldehyde

| Run No. | Ratio Acid:Formaldehyde | % Conversion Acid |
|---|---|---|
| 5825-184 | 1:1 | 41.9 |
| 5886-165 | 2:1 | 23.0 |
| 6045-68 | 3:1 | 19.2 |
| 6045-86 | 4:1 | 15.0 |
| 6045-87 | 5:1 | 12.1 |

| Run No. | % Selectivity Alpha-Methacrylic Acid | Yield (a) | % Selectivity to 3 Pentanone |
|---|---|---|---|
| 5825-184 | 74.7 | 31.3 | 0.80 |
| 5886-165 | 80.0 | 18.4 | 5.14 |
| 6045-68 | 63.6 | 12.2 | 11.8 |
| 6045-86 | 69.3 | 10.4 | 23.7 |
| 6045-87 | 49.1 | 5.9 | 38.5 |

Reaction Conditions:
Temperature: 385–390° C.
Contact Time: 3–4 sec.
Catalyst Wt.: 2.6 gms
Catalyst Vol.: 4.7 ml
N2 Carrier Rate: 6.0 ml/min (a) Based on propionic acid The above data indicate that the 1:1 and 2:1 ratios of propionic acid to formaldehyde result in the highest percent conversion of propionic acid to alpha-methacrylic acid with the lowest selectivities to 3-pentanone and with good selectivities to alpha-methacrylic acid.

EXAMPLE XIII

In the procedure of Examples VII to XI, synthesis of alpha-methacrylic acid from propionic acid and formaldehyde (as trioxane) were made using Catalyst D but using reaction temperatures of 350° C., 385° C., 425° C. and 490° C. Results are in Table IV.

TABLE IV

Effect of Temperature Upon Selectivity to Alpha-Methacrylic Acid

| Run No. | Reaction Temperature ° C. | % Conversion of Acid |
| --- | --- | --- |
| 6045-64 | 350 | 5.4(a) |
| 6045-65 | 385 | 19.2 |
| 6045-66 | 425 | 33.2 |
| 6045-67 | 490 | 53.8 |

| Run No. | % Selectivity to Alpha-Methacrylic Acid | % Selectivity to 3-Pentanone |
| --- | --- | --- |
| 6045-64 | 46.3(a) | 24.3 |
| 6045-65 | 63.6 | 11.8 |
| 6045-66 | 46.3 | 10.2 |
| 6045-67 | 5.25 | 24.8 |

Conditions:
Contact Time: 3.0–3.7 sec.
Mole Ratio-Acid:Formaldehyde: 3:1
Catalyst Wt.: 2.6 gms
Catalyst Vol.: 4.7 ml
$N_2$ Carrier Rate: 6 ml/min Note:
(a) Below 10% conversion, selectivity is subject to experimental error of between 20 to 30% (absolute).

The above data indicate that acid conversion increases with high temperatures, but that selectivity to alpha-methacrylic acid decreases. Accordingly, the lower reaction temperatures are preferred.

EXAMPLE XIV

In the procedure of Example VI to XI, syntheses of alpha-methacrylic acid from propionic acid and formaldehyde (as trioxane) were made using Catalyst D. Additions of water were made to the feed in percentages of 2, 4 and 8%. Results are in Table V.

TABLE V

Effect of Water Upon Selectivity to Alpha-Methacrylic Acid

| Run No. | Wt. % Water in Feed | % Conversion of Acid |
| --- | --- | --- |
| 1 | 0 | 23.5 |
| 2 | 2 | 23.4 |
| 3 | 4 | 22.4 |
| 4 | 8 | 18.4 |

| Run No. | % Selectivity to Alpha-Methacrylic Acid | % Selectivity to 3-Pentanone |
| --- | --- | --- |
| 1 | 85.1 | 5.14 |
| 2 | 88.2 | 4.77 |
| 3 | 88.2 | 3.69 |
| 4 | 89.0 | 3.49 |

Conditions:
Temperature: 390° C.
Mol Ratio-Acid:Formaldehyde: 2:1
Contact Times: 2.8 to 3.2 sec.
Catalyst Wt.: 2.6 gms
Catalyst Vol.: 4.7 ml
$N_2$ Carrier Rate: 6 ml/min The above data indicate that presence of water in the reaction of propionic acid with formaldehyde tends to deactivate the reaction when water content is about 8% or more by weight in the feed. Conversion of acid diminishes with water content above 4 (wt)%. Selectivity to 3-pentanone also diminishes with consequent lower consumption of acid.

EXAMPLE XV

In the procedure of Examples VI to XI, syntheses of alpha-methacrylic acid from propionic acid (PA) and formaldehyde (FA) (as trioxane) were made using a silica gel prepared from a high sodium content, amorphous silica colloid (Ludox (Trademark) HS-40 colloidal silica, a product of E. I. du Pont de Nemours & Co., Inc.). The catalyst was prepared by gellation at pH 5.5, followed by drying at 120° C. for 16 hours, and crushing and sieving to 18/40 mesh (U.S. sieve). The resulting material was cooled to room temperature and divided into two portions. One portion was calcined for 12 hours at 1000° F. The other portion was washed once with cold distilled water and then calcined for 12 hours at 1000° F. The washing procedure reduced sodium content from 10,000 parts per million (ppm) in the unwashed catalyst to 1760 ppm in the washed catalyst.

A second silica gel catalyst was prepared in the same procedure using an ammonium-stabilized, low sodium content amorphous silica colloid (Ludox (Trademark) AS-40 colloidal silica, a product of E. I. du Pont de Nemours & Co., Inc.). The silica colloid was gelled at pH 5.5, dried at 120° C. for 16 hours, crushed and sieved to 18/40 (U.S. sieve), cooled and divided into two parts. One portion was calcined for 12 hours at 1000° F. The other portion was washed five times with hot (90° C.) distilled water, then calcined for 12 hours at 1000° F. The washing procedure reduced sodium content from 2290 ppm in the unwashed catalyst to 160 ppm in the washed catalyst.

The four catalyst samples were evaluated for catalyst activity. Sodium content of the catalysts affected catalyst yield and selectivity drastically. A sodium content of 10,000 ppm resulted in lower propionic acid (PA) selectivity and formaldehyde (FA) selectivity than with a sodium content of 1760 ppm. A sodium content of 160 ppm resulted in lower yield and selectivity than with a sodium content of 2290 ppm.

The reaction conditions for all tests were: temperature 390° C., syringe pump rate 0.0774 ml/min., contact time 3.2 sec.; molar feed rate: HS-40 catalysts, 2:1 propionic acid (PA) to formaldehyde (FA); AS-40 catalysts, 2:1 and 1.54:1 PA to FA.

The resulting data indicate that an alkali content, as sodium, of from about 200 ppm to about 15,000 ppm is required for catalyst activity and selectivity. The ammonium-stabilized low sodium content amorphous silica colloid catalyst AS-40 demonstrated activity equivalent to the washed high sodium amorphous colloidal silica catalyst from which sodium had been removed. Preferred alkali content, as sodium, is from about 1000 ppm to about 9000 ppm. The data are in Table VI.

TABLE VI

Effect of Catalyst Sodium Content Upon Synthesis of Alpha-Methacrylic Acid

| Catalyst | Characteristics | | | | Yield Based on PA % | Selectivity Based on | |
| --- | --- | --- | --- | --- | --- | --- | --- |
| | Al ppm | Na ppm | Area $m^2/g$ | Pore Å | | PA % | FA % |
| HS-40 | 236 | 10,000 | 155 (a) | 138 (b) | 18 | 52 | 51** |
| HS-40-W | 257 | 1,760 | 175 | 130 | 20 | 71 | 82** |
| AS-40 | 400 | 2,100 | 110 | 200 | 20 | 86 | 82** |
| AS-40 | 227 | 2,290 | 125 | 198 | 24* | 77* | 78* |

TABLE VI-continued

Effect of Catalyst Sodium Content Upon Synthesis of Alpha-Methacrylic Acid

| Catalyst | Characteristics | | | | Yield Based on PA % | Selectivity | |
|---|---|---|---|---|---|---|---|
| | Al ppm | Na ppm | Area m²/g | Pore Å | | PA % | FA % |
| AS-40-W | 120 | 160 | 123 | 176 | 8 | 44 | 50** |

(a) BET surface area
(b) Avg. Pore Diameter
*Feed mol ratio of 1.54:1 PA to FA
**Feed mol ratio of 2.0:1.0 PA to FA
W: Indicates washed catalyst

EXAMPLE XVI

In the procedure of Examples VI to Xi and Example XV, syntheses of alpha-methacrylic acid from propionic acid and formaldehyde (as trioxane) were made using a silica gel catalyst AS-40 prepared from a low sodium content, amorphous colloidal silica (Ludox (Trademark) AS-40 colloidal silica). Characteristics of the catalyst were: 400 ppm Al, 2100 ppm Na, 110 m²/g area, 200 Å, pore size.

The catalyst was evaluated in aging studies. Reaction conditions for all studies were the same: temperature 390° C., syringe pump rate 0.0774 ml/min., contact time 3.2 sec., mol feed rate 2.1 propionic acid (PA) to formaldehyde (FA); catalyst weight 2.60 g. Aging effects upon catalyst activity in preparation of alpha-methacrylic acid (MA) are shown in Table VII.

As shown in Table VII, yield of alpha-methacrylic acid increased over the period of the first 72 hours during the activation period then gradually decreased over the period of 72 to 144 hours. The catalyst was regenerated by heating from ambient temperature to 1000° F. over 12 hours, then calcining at 1000° F. for 12 hours, after which time product yield increased to 7.6 (wt)% from 4.2 (wt)%.

TABLE VII

Aging Effects Upon Catalyst Activity

| Time-Hrs. | Yield of MA (Based on PA) % |
|---|---|
| Activation Period | |
| Up to 24 Hrs. | 17.8 |
| Up to 49 Hrs. | 21.1 |
| Up to 72 Hrs. | 21.8 |
| Deactivation Period | |
| 72 Hrs. to 95 Hrs. | 13.0 |
| 95 Hrs. to 120 Hrs. | 6.1 |
| 120 Hrs. to 144 Hrs. | 4.2 |
| Regeneration Period | |
| 144 Hrs. to 168 Hrs. | 7.6 |

EXAMPLE XVII

In the procedure of Example XVI, Catalyst AS-40W deactivation was evaluated wherein catalyst regeneration by calcining in the procedure of Example XVI was made for 24 hours at 1000° F. after each 72 hour reaction run at 390° C., using a 2:1 mol ratio of propionic acid (PA) to formaldehyde (FA) and 6 ml/min. N₂ carrier rate. Results are in Table VIII.

TABLE VIII

Deactivation-Regeneration-Deactivation Cycles AS-40W Catalyst

| Hours on Stream | Yield-MA % |
|---|---|
| 24 | 18.8 |
| 48 | 18.1 |
| 72 | 17.0 |
| (Regeneration-24 Hrs.) | |
| 96 | 17.1 |
| 120 | 17.8 |
| 144 | 14.8 |
| (Regeneration-24 Hrs.) | |
| 168 | 12.6 |
| 192 | 14.1 |
| 216 | 13.5 |
| (Regeneration-24 Hrs.) | |
| 240 | 12.4 |
| 264 | 13.5 |
| 288 | 12.2 |
| (Regeneration-24 Hrs.) | |
| 312-456 (a) | 12.1-14.1 |
| 456-744 (a) | 14.1-13.1 |

(a) Regeneration every 72 hours

EXAMPLE XVIII

Alkali Metal Ion Replacement

In the procedure of Example XVI and XVII, aging studies were made of Catalyst AS-40W. Catalyst characteristics were: 400 ppm Al, 2100 ppm Na, 100 m²/g area, 200 Å pore size. Reaction conditions were: temperature 390° C., syringe pump rate 0.0774 ml/min.; contact time 3.2 sec., mol feed rate 2:1 propionic acid (PA) to formaldehyde (FA), catalyst weight 2.60 g.

The liquid feed to the tubular reactor contained 100 ppm of sodium propionate. The catalyst was regenerated every 72 hours by heating the catalyst from room temperature to 528° C. over a period of 12 hours, then calcining at 528° C. for 12 hours. A control run was made wherein no sodium propionate was added to the feed. Results are in Table IX.

TABLE IX

Activity of Silica Gel Catalyst With Added Sodium Ions In Feed

| Days on Stream | Yield-MA % | |
|---|---|---|
| | Na⁺ Added | No Na⁺ Added |
| 1 | 21 | 20.0 |
| 4 | 20 | 19.0 |
| 7 | 19.8 | 13.8 |
| 10 | 19.2 | 12.1 |
| 12 | 18.4 | — |

EXAMPLE XIX

Alkali Metal Ion Replacement

A 33.4 g sample of uncalcined but dried catalyst was prepared in the procedure of Example V. The resulting material was analyzed by A.A. spectroscopy and reported to contain 380 ppm sodium and 290 ppm aluminum. Trisodium phosphate dodecahydrate, 1.1 g, was then impregnated into the silica by the incipient wetness technique to cause the catalyst to contain about 2700 ppm phosphorus. The incipient wetness technique comprises adding the trisodium phosphate-water solution to the dried catalyst until visible wetness is discerned on the particle surface. This is also known as the porefilling technique. The material was then calcined at 528° C. for 12 hours, 12 hours being required to increase the temperature from ambient to 528° C.. The resulting catalyst contained 2700 ppm phosphorus and 6000 ppm sodium.

The catalyst was evaluated in the procedure of Example XVII with two different trisodium phosphate replacement levels, 3.6 ppm P and 11 ppm P. The 3.6 ppm phosphorus and 11 ppm phosphorus feed components were dissolved as $Na_3PO_4 \cdot 12H_2O$. Regeneration period was every two days (48 hrs). Process details were: catalyst 2700 ppm P (as $Na_3PO_4$) on AS-40W; catalyst vol. 4.7 cc; reaction temp. 400 contact time 3 sec.; $N_2$ carrier 6 ml/min., air carrier 6 ml/min., feed 1:1 mol ratio PA:FA. Results are in Table X.

TABLE X

Effect of Alkali Metal Ion In Feed Upon Catalyst Activity

| | Selectivity (a) % | | Yield (a) % | |
|---|---|---|---|---|
| Days on Stream | 3.6 ppm P | 11 ppm P | 3.6 ppm P | 11 ppm P |
| 1 | 68 | 68 | 24.0 | 26.5 |
| 3 | 66 | 64 | 26.0 | 26.0 |
| 5 | 68 | 60 | 27.5 | 25.0 |
| 7 | 64.5 | 58 | 28.0 | 24.5 |
| 9 | 65 | 54 | 28.5 | 23.0 |

(a) Based on propionic acid (PA)

The above data indicate that at a lower replacement level of alkali metal ion, catalyst activity and selectivity were maintained at a higher level.

EXAMPLE XX

AS-40W catalysts, prepared in the procedure of Example V, were impregnated with other alkali metal phosphates to a level of 1350 ppm phosphorus according to the procedure of Example XIX to determine the activities at several reaction temperatures of other alkali species, i.e., potassium, rubidium and cesium phosphates, according to the procedure of Example XV. For these three, the yields of alpha-methacrylic acid differed less than 2% and potassium was about 2% greater than the yield obtained with sodium (Rb>Cs>K>Na). At the same temperature the propionic acid selectivities were within 5% of each other, and the selectivity obtained with sodium was about 3% greater than that obtained with potassium. Process details were: catalyst volume 4.7 cc; contact time 3 sec.; $N_2$ carrier rate 6 ml/min.; feed 2:1 mol ratio PA:FA; LHSV 1 (vol.-based). Results as to yields are in Table XII.

TABLE XII

Yields Using Alkali Metal Phosphate AS-40W Catalysts

| | Reaction Temperature | | | | | |
|---|---|---|---|---|---|---|
| | 390° C. | | 400° C. | | 410° C | |
| | % Y | % S | % Y | % S | % Y | % S |
| $Na_3PO_4$ | 19.2 | 75.7 | 21.1 | 71.0 | 21.9 | 72.1 |
| $K_3PO_4$ | 21.1 | 72.1 | 22.9 | 68.4 | 22.1 | 60.0 |
| $Rb_3PO_4$ | 21.3 | 70.9 | 24.5 | 66.8 | 23.4 | 57.4 |
| $Cs_3PO_4$ | 21.4 | 70.1 | 23.4 | 64.3 | 21.8 | 59.4 |

Note:
Y - Yield based on propionic acid
S - Selectivity based on propionic acid

EXAMPLE XXI

In the procedure of Examples VI to XI and Example XV, a synthesis of alpha-methacrylic acid from propionic acid and formaldehyde (as trioxane) was made using an alkali metal phosphate AS-40 catalyst, prepared in the procedures of Examples V and XIX, containing 1350 ppm phosphorus. The alkali metal phosphate was $Cs_3PO_4$ which was selected because of its high activity.

The catalyst was evaluated in the presence of hydrocarbon diluent. Reaction conditions were: temperature 390° C., syringe pump rate 0.0774 ml/min., contact time 3.7 (approx.) sec., $N_2$ carrier gas flow rate 6.0 ml/min., LHSV 1 (vol. based), catalyst vol. 4.7 cc.

A feed solution was prepared consisting of 10.0 ml (8.65g) toluene, 2.8g formaldehyde (as trioxane) and 1.0 ml (0.99g) of propionic acid. A portion of the feed solution, 9.0g, was passed through the reactor. The 9.0g contained 6.25g (0.068 mol) toluene, 2.04g (0.068 mol) formaldehyde, and 0.72g (0.0097 mol) propionic acid. The 1:7 ratio (0.0097 mol:0.068 mol), propionic acid:formaldehyde was equivalent to a ratio of 0.143:1. Gas chromatographic and titration analyses indicated conversion of propionic acid was essentially complete. Yield of alpha-methacrylic acid based on propionic acid was 76%. Selectivity to alpha-methacrylic acid based on propionic acid was about 76%.

The above data demonstrate that in the presence of a diluent such as toluene, excess quantities of formaldehyde in feed cause additional conversion of propionic acid to alpha-methacrylic acid to very high levels, as much as 76%, based on propionic acid, in the presence of alkali metal impregnated AS-40 catalyst.

EXAMPLE XXII

Cesium Ion Replacement

For this Example a minireactor was used to evaluate the performance of the catalyst. All runs were made with a PA/FA molar ratio of about 3/2. The minireactor comprised an elongated 12.7 mm O.D. quartz tube having an externally-controllable thermowell longitudinally disposed along the longitudinal axis. The catalyst to be tested was placed in the quartz tube, and about the thermowell, forming an annular catalyst bed. Each bed of catalyst contained about 2 to about 3 grams of catalyst having a particle size of about 20-40 mesh (U.S. Sieve Series). A spun quartz plug supported the catalyst bed.

Trioxane (the FA source) was thermally cracked to monomeric formaldehyde by passing the feed through a hot reactor zone, heated to a temperature of about 390 to about 440 deg. C, located above the catalyst zone.

Gaseous feed was passed over the catalyst continuously for typically 120 hours, followed by a 24 hour period in which no feed was passed over the catalyst, but a flow of 6 ml/min of air was passed over it in order to remove accumulated tar and coke from the catalyst. At least one aliquot sample of reactor effluent was collected for analysis each day while feed was passed over the catalyst. Sampling procedures for analytical purposes included collection of about 10 to about 25 grams of the reactor effluent in a tared U-tube or Erlenmeyer-type receiver containing about 10 to about 25 ml of isopropanol at room temperature. Reactor effluent samples were analyzed by gas chromatography. An internal standard technique was used.

Isothermal aging studies were carried out with separate portions of a catalyst consisting of about 3.8% Cs+ on a silica support or of a similar catalyst containing about 3.9% Cs+ on a silica support, and with propionic acid/formaldehyde feed containing zero, about 5, about 16, and about 37 ppm Cs− as cesium propionate. The cesium originally present in the catalysts was added during catalyst preparation as cesium carbonate. In each lifetime study, the temperature of the catalyst was maintained at about 315° C., and the WHSV was about 1.5 g feed per g catalyst per hour. Conversion of PA and selectivity to MA (averaged over 5 day intervals) over about 65 days on feed are summarized below in Table XIII.

It can be seen that when feed containing no added Cs+ was used, conversion of PA decreased from about 30% to about 22%, while selectivity to MA increased slightly from about 86% to about 91%. The Cs+ content on the catalyst decreased from 3.8% to about 2.4%. When feed containing 5 ppm Cs+ was used, conversion of PA decreased from about 27% to about 25%, and selectivity to MA decreased slightly from about 88% to about 85%. The cesium ion content of the catalyst decreased from 3.8% to about 2.8%. This illustrates that even a small amount of Cs+ present in the feed retards the rate of loss of catalytic activity, as shown by PA conversion. When the feed contained about 37 ppm Cs+, the average PA conversion increased slightly from about 28% to about 29%, and selectivity to MA decreased from about 86% to about 76%. The Cs+ content of the catalyst increased from 3.9% to about 5.8%. This case illustrates that 37 ppm Cs+ was more than was required in order maintain the original Cs+ level on the catalyst. Conversion was maintained at the original level, but some deterioration of selectivity was observed.

A catalyst lifetime study was carried out with the catalyst containing 3.9% Cs+ and with propionic acid/formaldehyde feed containing about 16 ppm Cs+, for a length of about 185 days. Conversion of PA and selectivity to MA (averaged over 5 day intervals) are also summarized in Table XIII. In this case, the conversion of PA increased slightly from the initial level of 27% to about 28% after 65 days on feed, then gradually decreased to a level of about 26% after 185 days. Selectivity to MA remained relatively constant over the entire 185 days, averaging about 86%. At the end of 185 days on feed, the catalyst contained about 3.7%, compared with 3.9% originally. This illustrates that about 16 ppm Cs+ in the feed was effective for maintaining the initial cesium level on the catalyst, and also maintained the initial catalytic performance for a time period at least 4.5 times as long as when feed without Cs+ was used.

TABLE XIII

| | Catalyst: | | | | | | | |
|---|---|---|---|---|---|---|---|---|
| | 3.8% Cs+/ SiO$_2$ | | 3.8% Cs+/ SiO$_2$ | | 3.9% Cs+/ SiO$_2$ | | 3.9% Cs+/ SiO$_2$ | |
| | | | | Cs+ in Feed: | | | | |
| Days on | 0 ppm Cs+ | | 5 ppm Cs+ | | 37 ppm Cs+ | | 16 ppm Cs+ | |
| Feed | % PAC | % PAS | % PAC | % PAS | % PAC | % PAS | % PAC | % PAS |
| 5 | 30.2 | 86 | 26.2 | 88 | 27.6 | 86 | 26.6 | 88 |
| 10 | 29.1 | 85 | 26.3 | 88 | 28.9 | 84 | 28.3 | 84 |
| 15 | 28.4 | 86 | 27.4 | 87 | 28.4 | 85 | 26.7 | 89 |
| 20 | 28.1 | 87 | 27.3 | 85 | 28.6 | 83 | 28.4 | 86 |
| 25 | 29.2 | 84 | 27.7 | 83 | 27.5 | 83 | 28.0 | 86 |
| 30 | 27.5 | 86 | 26.1 | 87 | 28.0 | 86 | 29.2 | 82 |
| 35 | 27.6 | 86 | 25.7 | 88 | 28.9 | 83 | 28.3 | 85 |
| 40 | 26.8 | 87 | 26.2 | 85 | 28.1 | 84 | 28.2 | 86 |
| 45 | 26.1 | 87 | 25.9 | 86 | 27.2 | 85 | 28.8 | 84 |
| 50 | 24.7 | 92 | 25.3 | 86 | 27.2 | 83 | 30.1 | 83 |
| 55 | 24.5 | 88 | 24.6 | 87 | 26.4 | 83 | 29.4 | 86 |
| 60 | 23.5 | 92 | 24.8 | 85 | 28.4 | 79 | 29.2 | 85 |
| 65 | 22.5 | 91 | | | 28.8 | 76 | 28.1 | 87 |
| 70 | 21.4 | 89 | | | | | 28.8 | 85 |
| 75 | | | | | | | 28.9 | 85 |
| 80 | | | | | | | 27. | 89 |
| 85 | | | | | | | 28.3 | 88 |
| 90 | | | | | | | 28.0 | 91 |
| 95 | | | | | | | 27.1 | 91 |
| 100 | | | | | | | 27.1 | 92 |
| 105 | | | | | | | 26.5 | 93 |
| 110 | | | | | | | 27.6 | 91 |
| 115 | | | | | | | 28.3 | 88 |
| 120 | | | | | | | 28.8 | 89 |
| 125 | | | | | | | 29.4 | 84 |
| 130 | | | | | | | 27.7 | 88 |
| 135 | | | | | | | 27.2 | 88 |
| 140 | | | | | | | 26.4 | 88 |
| 145 | | | | | | | 27.3 | 85 |
| 150 | | | | | | | 27.5 | 83 |
| 155 | | | | | | | 27.6 | 83 |
| 160 | | | | | | | 27.7 | 81 |
| 165 | | | | | | | 26.9 | 84 |
| 170 | | | | | | | 26.9 | 81 |
| 175 | | | | | | | 25.7 | 86 |
| 180 | | | | | | | 25.3 | 87 |
| 185 | | | | | | | 25.9 | 84 |

EXAMPLE XXIII

Cesium Ion Replacement

The same cesium replenishment technique described in Example XXII was also applied to a catalyst consisting of 6.6% Cs+ on a 50/50 SnO₂/SiO₂ mixed-oxide support. Conversion of PA and selectivity to MA (averaged over 5 day intervals) over at least 40 days on feed are summarized in Table XIV. Propionic acid/formaldehyde feeds containing zero and about 37 ppm Cs+ as cesium propionate were used. In each case, the temperature of the catalyst was maintained at about 307° C., and the WHSV was about 1.5 g feed per g catalyst per hour.

With feed containing no added Cs+, the PA decreased from about 37% to about 26% after 40 days on feed. Selectivity increased slightly from about 88% to about 91%. When the feed contained about 37 ppm Cs+, the conversion of PA did not change over 40 days, remaining at a level of about 36%. Selectivity also remained relatively constant. A continuation of this study for 150 days resulted in a gradual loss of conversion to a level of about 30% after 150 days. Selectivity increased slightly to about 92%. After 150 days on feed, the catalyst contained 7.9% Cs+, an increase of about 20% relative to the cesium content of the original catalyst.

TABLE XIV

| | Catalyst: | | | |
|---|---|---|---|---|
| | 6.6% Cs+/ SiO₂/SnO₂ | | 6.6% Cs+/ SiO₂/SnO₂ | |
| | Cs+ in Feed: | | | |
| | 0 ppm Cs+ | | 37 ppm Cs+ | |
| Days on Feed | % PAC | % PAS | % PAC | % PAS |
| 5 | 37.1 | 88 | 26.0 | 87 |
| 10 | 38.7 | 84 | 36.1 | 86 |
| 15 | 33.4 | 87 | 36.2 | 84 |
| 20 | 32.2 | 87 | 36.1 | 86 |
| 25 | 30.5 | 87 | 35.6 | 90 |
| 30 | 29.0 | 88 | 34.9 | 90 |
| 35 | 27.6 | 89 | 35.2 | 90 |
| 40 | 26.4 | 91 | 36.0 | 88 |
| 45 | | | 35.3 | 88 |
| 50 | | | 34.5 | 90 |
| 55 | | | 34.0 | 89 |
| 60 | | | 33.2 | 91 |
| 65 | | | 33.4 | 91 |
| 70 | | | 33.5 | 90 |
| 75 | | | 33.1 | 92 |
| 80 | | | 33.1 | 91 |
| 85 | | | 32.4 | 92 |
| 90 | | | 32.0 | 92 |
| 95 | | | 33.1 | 91 |
| 100 | | | 33.2 | 89 |
| 105 | | | 32.8 | 89 |
| 110 | | | 33.3 | 84 |
| 115 | | | 32.6 | 86 |
| 120 | | | 31.9 | 89 |
| 125 | | | 31.8 | 87 |
| 130 | | | 31.2 | 89 |
| 135 | | | 31.2 | 91 |
| 140 | | | 31.4 | 88 |
| 145 | | | 31.0 | 88 |
| 150 | | | 29.7 | 92 |

What is claimed is:

1. In a process for making an alpha, beta-ethylenically unsaturated carboxylic acid by contacting formaldehyde and a saturated monocarboxylic acid at vapor-phase condensation conditions over a particulate catalyst comprising a minor amount of alkali metal ion and a major amount of porous silica gel, wherein said catalyst loses said alkali metal ion with consequent decrease in catalyst activity, the improvement consisting of maintaining said catalyst activity by incorporating a volatile or soluble compound of said alkali metal ion in a gaseous feed stream to said process, said feed stream containing at least said saturated monocarboxylic acid, and depositing at least some alkali metal ion contained in said gaseous feed stream on said catalyst.

2. The process of claim 1 wherein said monocarboxylic acid is propionic acid and said alpha, beta-ethylenically unsaturated carboxylic acid is methacrylic acid.

3. The process of claim 2 wherein said alkali metal ion is cesium ion.

4. The process of claim 3 wherein the concentration of said cesium ion in said gaseous feed stream is in the range of about 5 ppm to about 50 ppm by weight.

5. The process of claim 3 wherein the amount of said alkali metal compound in said gaseous feed stream is modulated to maintain a desired alkali metal ion concentration on said catalyst.

6. The process of claim 2 wherein said alkali metal ion is cesium ion and said alkali metal compound is cesium hydroxide, carbonate or propionate.

7. The process of claim 6 wherein said volatile or soluble alkali metal compound is cesium propionate.

8. The process of claim 6 wherein the concentration of said cesium ion in said gaseous feed stream is in the range of about 5 ppm to about 50 ppm by weight.

9. The process of claim 6 wherein the amount of said cesium compound in said gaseous feed stream is modulated to maintain a desired cesium concentration on said catalyst.

10. The process of claim 2 wherein said catalyst additionally contains particulate tin (IV) oxide.

11. The process of claim 10 wherein said alkali metal ion is cesium ion and said alkali metal compound is cesium hydroxide, carbonate or propionate.

12. The process of claim 11 wherein said alkali metal compound is cesium propionate.

13. The process of claim 11 wherein the concentration of said cesium ion in said gaseous feed stream is in the range of about 5 ppm to about 50 ppm by weight.

14. The process of claim 11 wherein the amount of said cesium compound in said gaseous feed stream is modulated to maintain a desired cesium concentration on said catalyst.

* * * * *

UNITED STATES PATENT OFFICE
CERTIFICATE OF CORRECTION

Patent No. 4,990,662                    Dated February 5, 1991

Inventor(s) Gary P. Hagen, Ruth A. Montag

It is certified that error appears in the above-identified patent and that said Letters Patent is hereby corrected as shown below:

| Column | Line | | |
|---|---|---|---|
| 5  | 36 | "acidformaldehyde" should read | --acid-formaldehyde-- |
| 11 | 14 | "Result" should read | --Results-- |
| 12 | 7  | "Yield on:" should read | --% Yield on:-- |
| 15 | 18 | "Xi" should read | --XI-- |
| 17 | 13 | "400" should read | --400°C-- |
| 19 | 6  | "$Cs^-$" should read | --$Cs^+$-- |
| 20 | 45 | "27." should read | --27.9-- |

Signed and Sealed this

Eleventh Day of August, 1992

*Attest:*

DOUGLAS B. COMER

*Attesting Officer*     Acting Commissioner of Patents and Trademarks